(12) United States Patent
Kashiwagi et al.

(10) Patent No.: US 12,490,637 B2
(45) Date of Patent: Dec. 2, 2025

(54) DISPLAY DEVICE AND METHOD FOR MANUFACTURING OPTICAL FILM

(71) Applicant: Dai Nippon Printing Co., Ltd., Tokyo (JP)

(72) Inventors: Tsuyoshi Kashiwagi, Tokyo (JP); Shinsuke Nakazawa, Tokyo (JP); Takahiro Takeshima, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 338 days.

(21) Appl. No.: 17/905,263

(22) PCT Filed: Mar. 12, 2021

(86) PCT No.: PCT/JP2021/010146
§ 371 (c)(1),
(2) Date: Aug. 30, 2022

(87) PCT Pub. No.: WO2021/182620
PCT Pub. Date: Sep. 16, 2021

(65) Prior Publication Data
US 2023/0093069 A1 Mar. 23, 2023

(30) Foreign Application Priority Data

Mar. 13, 2020 (JP) .................................. 2020-044520
Feb. 12, 2021 (JP) .................................. 2021-021092

(51) Int. Cl.
*H10K 59/80* (2023.01)
*G02F 1/1335* (2006.01)

(52) U.S. Cl.
CPC ..... *H10K 59/879* (2023.02); *G02F 1/133507* (2021.01)

(58) Field of Classification Search
CPC .... G02B 5/201; G02B 5/1819; H10K 59/879; H10K 50/85; G02F 1/133562
See application file for complete search history.

(56) References Cited

U.S. PATENT DOCUMENTS 6,224,223 B1 * 5/2001 Higuchi ............... G02B 6/0048
362/618
9,507,059 B2  11/2016 Shim et al.
(Continued)

FOREIGN PATENT DOCUMENTS

CN  102809846 A  12/2012
JP  H07-043704 A  2/1995
(Continued)

OTHER PUBLICATIONS

International Search Report and Written Opinion dated May 18, 2021 (Application No. PCT/JP2021/010146).
(Continued)

*Primary Examiner* — Jonathan Y Jung
(74) *Attorney, Agent, or Firm* — BURR PATENT LAW, PLLC

(57) ABSTRACT

A display device includes a display panel that emits light from a plurality of pixels arrayed at predetermined pixel array pitches and an optical film, placed over the display panel so as to allow passage of light from the plurality of pixels, that includes first and second optical functional parts differing in optical performance from each other. The first and second optical functional parts are arrayed at predetermined functional part array pitches. Assuming that p (μm) denotes the pixel array pitches, that q (μm) denotes the functional part array pitches, and that d (μm) denotes a distance in a face-to-face direction between surfaces of the (Continued)

pixels that face the optical film and a surface of the optical film that faces the pixels, $q \leq 0.5p$ and $\tan(\operatorname{asin}(0.7/q)) < p/d$ hold.

4 Claims, 3 Drawing Sheets

(56) References Cited

U.S. PATENT DOCUMENTS

| | | |
|---|---|---|
| 2011/0128483 A1 | 6/2011 | Park et al. |
| 2012/0182506 A1 | 7/2012 | Park et al. |
| 2012/0307191 A1* | 12/2012 | Park .................... G02B 5/0294 349/144 |
| 2014/0253843 A1* | 9/2014 | Kanno ................. G02B 5/0278 349/62 |
| 2016/0187699 A1 | 6/2016 | Ju et al. |
| 2018/0199030 A1* | 7/2018 | Smith .................. H04N 13/398 |
| 2019/0212607 A1* | 7/2019 | Tien .................... G02B 5/0236 |
| 2021/0036263 A1* | 2/2021 | Kim .................... H10K 59/8792 |

FOREIGN PATENT DOCUMENTS

| | | |
|---|---|---|
| JP | 3272833 B2 | 1/2002 |
| JP | 3621959 B2 | 2/2005 |
| JP | 2011-118393 A | 6/2011 |
| JP | 2012-145944 A | 8/2012 |
| JP | 2016-126350 A | 7/2016 |
| JP | 2018-005113 A | 1/2018 |
| WO | 2013/061964 A1 | 5/2013 |

OTHER PUBLICATIONS

Japanese Office Action (with English translation) dated Jan. 14, 2022 (Application No. 2021-021092).
Chinese Office Action (with English translation) dated Sep. 27, 2023 (Application No. 202211340549.6).
Taiwanese Office Action (with English translation) dated Dec. 1, 2023 (Application No. 110108984).
Chinese Office Action (Application No. 202211340549.6) dated Mar. 24, 2023 (with English translation).
English translation of the International Preliminary Report on Patentability (Chapter I) dated Sep. 22, 2022 (Application No. PCT/JP2021/010146).

* cited by examiner

DISPLAY DEVICE AND METHOD FOR MANUFACTURING OPTICAL FILM

TECHNICAL FIELD

The present disclosure relates to a display device including an optical film that exerts an optical effect on light that is emitted from a display surface of the display device and a method for manufacturing an optical film.

BACKGROUND ART

Liquid crystal display devices, which are examples of display devices, have been used in various fields. Further, organic LED (organic light-emitting diode) display devices have recently been coming into wider use.

A liquid crystal display device may show a great change in tint of an image within a viewing angle due to a change in intensity of light according to a observation angle, leakage of light in an oblique direction, or other reasons.

Meanwhile, in an organic LED display device, a blue shift in an obliquely-viewed image may occur. The term "blue shift" means a phenomenon in which an image appears more bluish when viewed from an oblique angle than when viewed from the front. That is, even an image that an organic LED display device displays may undergo a great change in tint within a viewing angle due, for example, to such a blue shift.

Such a change in color within a viewing angle may be a factor that causes deterioration in display quality of an image. Examples of other factors that affect the display quality include variations in contrast within the viewing angle. There have conventionally been proposed various technologies for bringing about improvement in display quality of an image. For example, JP H7-43704 A, JP 3272833 B, JP 3621959 B, JP 2016-126350 A, JP 2012-145944 A, JP 2011-118393 A, U.S. Pat. No. 9,507,059 A, and JP 2018-5113 A disclose optical films each of which is provided as a display surface of a display device so as to bring about improvement in display quality of an image.

SUMMARY OF INVENTION

The aforementioned optical films include an optical film in which two portions differing in refractive index from each other are alternately arrayed at regular pitches, an optical film in which a light-transmitting portion and a light-absorbing portion are alternately arrayed at regular pitches, or other optical films. Meanwhile, a display panel combined with such an optical film to constitute a display device usually includes pixels arrayed at regular pitches. Therefore, moire tends to occur when the display panel and the optical film are overlapped each other. Since moire may lower the quality of a display image, it is desirable to suppress moire or make moire less conspicuous.

Further, in the aforementioned optical films, image blurring attributed to diffraction may occur. Since such image blurring too may lower the quality of a display image, it is desirable to suppress image blurring or make image blurring less conspicuous.

The present disclosure was made in view of the aforementioned circumstances, and has as an object to provide a display device capable of preventing the viewability of a display image from being impaired by moire or diffraction and a method for manufacturing an optical film.

A display device according to the present disclosure is a display device including:

a display panel that emits light from a plurality of pixels arrayed at predetermined pixel array pitches; and an optical film, placed over the display panel so as to allow passage of light from the plurality of pixels, that includes first and second optical functional parts differing in optical performance from each other, the first and second optical functional parts being arrayed at predetermined functional part array pitches, wherein assuming that p (μm) denotes the pixel array pitches, that q (μm) denotes the functional part array pitches, and that d (μm) denotes a distance in a face-to-face direction between surfaces of the pixels that face the optical film and a surface of the optical film that faces the pixels, $q \leq 0.5p$ and $\tan(\mathrm{asin}(0.7/q)) < p/d$ hold.

Further, a display device according to the present disclosure is a display device including:

a display panel that emits light from a plurality of pixels arrayed at predetermined pixel array pitches; and an optical film, placed over the display panel so as to allow passage of light from the plurality of pixels, that includes first and second optical functional parts differing in optical performance from each other, the first and second optical functional parts being arrayed at predetermined functional part array pitches, wherein assuming that p (μm) denotes the pixel array pitches, that q (μm) denotes the functional part array pitches, that the first and second optical functional parts are arrayed at the functional part array pitches q in a direction identical to a direction in which the plurality of pixels are arrayed at the pixel array pitches p, and that d (μm) denotes a distance in a face-to-face direction between surfaces of the pixels that face the optical film and a surface of the optical film that faces the pixels, $q \leq 0.5p$ and $\tan(\mathrm{asin}(0.7/q)) < p/d$ hold.

Further, a display device according to the present disclosure is a display device including:

a display panel that emits light from a plurality of pixels arrayed at predetermined pixel array pitches; and an optical film, placed over the display panel so as to allow passage of light from the plurality of pixels, that includes first and second optical functional parts differing in optical performance from each other, the first and second optical functional parts being arrayed at predetermined functional part array pitches, wherein the plurality of pixels are arrayed in a first direction and arrayed in a second direction orthogonal to the first direction, the first and second optical functional parts are alternately arrayed in the first direction and the second direction, and assuming that the pixel array pitches at which the plurality of pixels are arrayed in the first direction are first pixel array pitches p1 (μm), that the pixel array pitches at which the plurality of pixels are arrayed in the second direction are second pixel array pitches p2 (μm), that the functional part array pitches at which the first and second optical functional parts are arrayed in the first direction are first functional part array pitches q1 (μm), that the functional part array pitches at which the first and second optical functional parts are arrayed in the second direction are second functional part array pitches q2 (μm), and that d (μm) denotes a distance in a face-to-face direction between surfaces of the pixels that face the optical film and a surface of the optical film that faces the pixels, $q1 \leq 0.5p1$ and $\tan(\operatorname{asin}(0.7/q1)) < p1/d$ hold and $q2 \leq 0.5p2$ and $\tan(\operatorname{asin}(0.7/q2)) < p2/d$ hold.

Each of the pixels may include a plurality of subpixels arrayed in a stripe matrix.

Each of the pixels may include a plurality of subpixels arrayed in a PenTile matrix.

The display panel may be an organic LED panel.

The display panel may be a liquid crystal panel.

A method for manufacturing an optical film according to the present disclosure is a method for manufacturing an optical film that is placed over a display panel that emits light from a plurality of pixels arrayed at predetermined pixel array pitches, the optical film including first and second optical functional parts differing in optical performance from each other, the first and second optical functional parts being arrayed at predetermined functional part array pitches, the method comprising the steps of:

determining the pixel array pitches p (μm);

determining a distance d (μm) in a face-to-face direction between surfaces of the pixels that face the optical film and a surface of the optical film that faces the pixels, the distance d (μm) being a distance at which the optical film is placed over the display panel; and determining the functional part array pitches as q (μm) so that $q \leq 0.5p$ and $\tan(\operatorname{asin}(0.7/q)) < p/d$ hold, wherein the optical film is manufactured on the basis of the functional part array pitches q (μm) thus determined.

Further, a method for manufacturing an optical film according to the present disclosure is a method for manufacturing an optical film that is placed over a display panel that emits light from a plurality of pixels arrayed in a first direction and arrayed in a second direction orthogonal to the first direction, the optical film including first and second optical functional parts differing in optical performance from each other, the first and second optical functional parts being alternately arrayed at predetermined functional part array pitches in the first direction and the second direction, the method comprising the steps of:

determining, as first pixel array pitches p1 (μm), the pixel array pitches at which the plurality of pixels are arrayed in the first direction and determining, as second pixel array pitches p2 (μm), the pixel array pitches at which the plurality of pixels are arrayed in the second direction;

determining a distance d (μm) in a face-to-face direction between surfaces of the pixels that face the optical film and a surface of the optical film that faces the pixels, the distance d (μm) being a distance at which the optical film is placed over the display panel; and determining, as first functional part array pitches q1 (μm), the functional part array pitches at which the first and second optical functional parts are arrayed in the first direction, determining, as second functional part array pitches q2 (μm), the functional part array pitches at which the first and second optical functional parts are arrayed in the second direction, and determining the first functional part array pitches q1 (μm) and the second functional part array pitches q2 (μm) so that $q1 \leq 0.5p1$ and $\tan(\operatorname{asin}(0.7/q1)) < p1/d$ hold and $q2 \leq 0.5p2$ and $\tan(\operatorname{asin}(0.7/q2)) < p2/d$ hold, wherein the optical film is manufactured on the basis of the first and second functional part array pitches q1 and q2 (μm) thus determined.

The present disclosure makes it possible to provide a display device capable of preventing the viewability of a display image from being impaired by moire or diffraction.

DESCRIPTION OF EMBODIMENTS

The following describes an embodiment of the present disclosure with reference to the drawings.

It should be noted that terms such as "sheet", "film", and "plate" used herein are not distinguished from one another solely on the basis of the difference in designation. Accordingly, the "sheet" is a concept that also encompasses a member that may be referred to as "film" or "plate". Further, the term "sheet surface (plate surface, film surface)" as used herein refers to a surface along a direction parallel with the plane (surface) of a sheet-like member of interest in a case where the sheet-like member of interest is seen holistically from a large perspective. It should be noted that the "sheet surface (plate surface, film surface)" may be sometimes referred to as "principal surface". Furthermore, the term "normal direction normal to a sheet-like member" refers to a normal direction normal to a sheet surface of a sheet-like member of interest.

Figure 1:
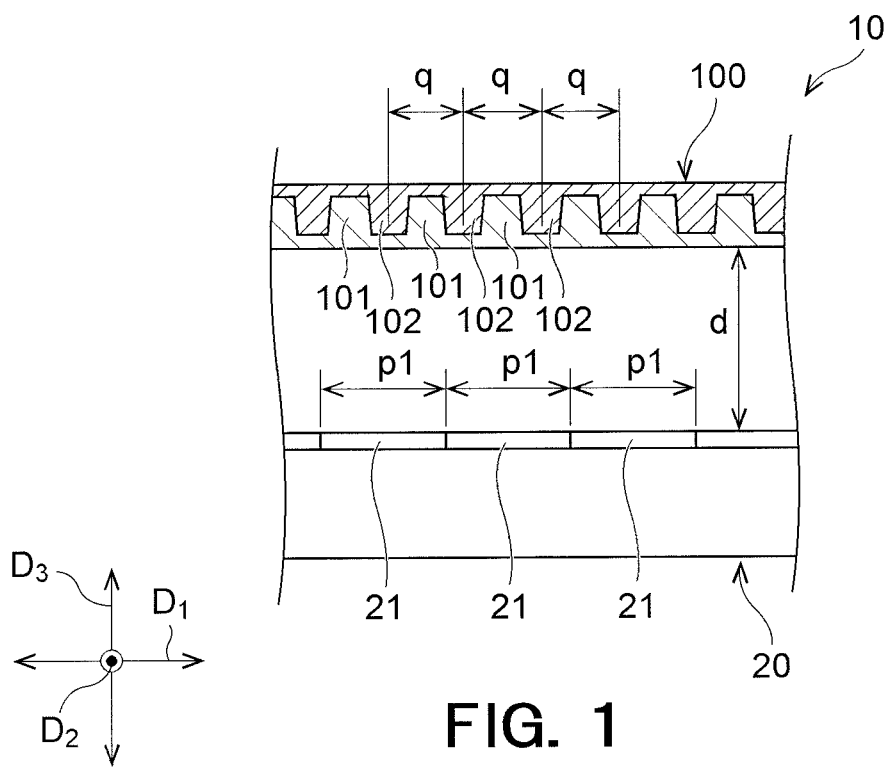
FIG. 1 is a diagram schematically showing a configuration of a display device according to an embodiment of the present disclosure.

FIG. 1 is a diagram schematically showing a configuration of a display device 10 according to an embodiment. The display device 10 includes an organic LED (organic light-emitting diode) panel 20 and an optical film 100. For example, the display device 10 according to the present embodiment is a television. Alternatively, the display device 10 according to the present embodiment may be a tablet terminal, a smartphone, a computer display, a car navigation system, or other devices.

It should be noted that the organic LED panel 20 and the optical film 100 may be adjacent to each other. Further, a circularly polarizing plate, a touch panel, a cover glass, or other members may be placed between the organic LED panel 20 and the optical film 100. In a case where a circularly polarizing plate, a touch panel, a cover glass, or other members are placed between the organic LED panel 20 and the optical film 100, adjacent members may be joined together by an adhesive layer.

The organic LED panel 20 is plate-like in shape, and the optical film 100 is placed so that a film surface of the optical film 100 is parallel to a plate surface of the organic LED panel 20. In FIG. 1 and the drawings to which the following description refers, the sign "$D_1$" denotes a first direction that is parallel with the plate surface of the organic LED panel 20 and the film surface of the optical film 100, and the sign "$D_2$" denotes a second direction that is parallel with the plate surface of the organic LED panel 20 and the film surface of the optical film 100 and orthogonal to the first direction $D_1$.

Further, the sign "$D_3$" denotes a third direction that is orthogonal to both the first direction $D_1$ and the second direction $D_2$.

Figure 2:
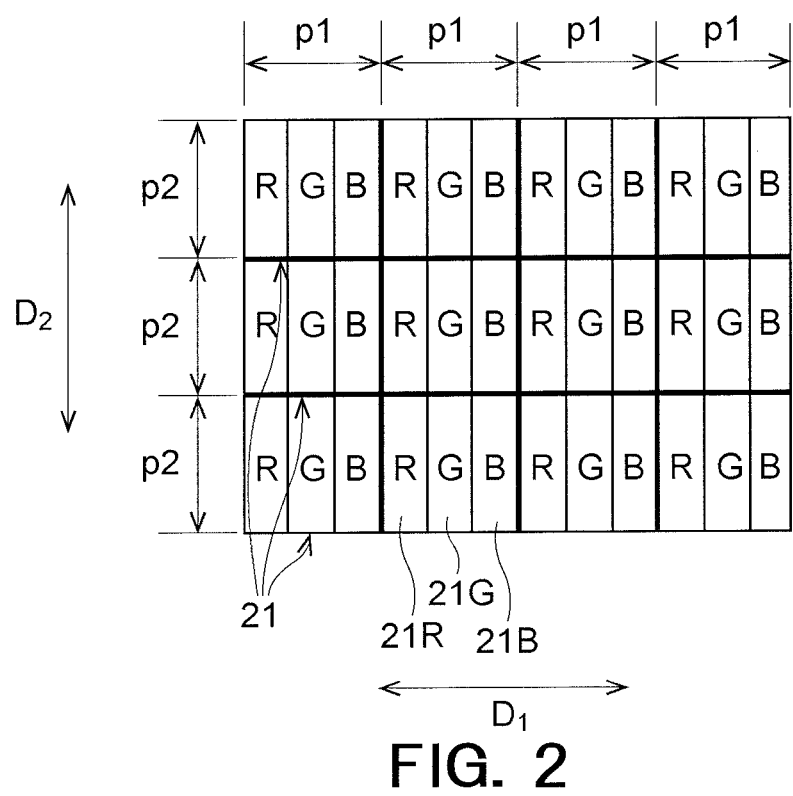
FIG. 2 is a diagram showing a pixel array of the display device shown in FIG. 1.

The organic LED panel 20 includes a plurality of pixels 21 each including a plurality of subpixels (in the present example, 21R, 21G, and 21B) differing in color from one another and emits light for image formation from the plurality of pixels 21. As shown in FIG. 2, each of the pixels 21 according to the present embodiment includes a plurality of subpixels 21R, 21G, and 21B arrayed in a stripe matrix.

The subpixel 21R emits red light. The subpixel 21G emits green light. The subpixel 21B emits blue light. It should be noted that each of the pixels 21 may further include, in addition to the subpixels 21R, 21G, and 21B, a subpixel that emits white light. The organic LED panel 20 may be a type of organic LED panel that transmits white light colored by a color filter or a so-called separately-colored type of organic LED panel in which RGB or other subpixels independently emit light.

Referring to FIGS. 1 and 2, the plurality of pixels 21 are arrayed at first pixel array pitches p1 in the first direction $D_1$, and are arrayed at second pixel array pitches p2 in the second direction $D_2$. Although, in the present embodiment, the first pixel array pitches p1 and the second pixel array pitches p2 are set to be equal in value to each other, they may be set to be different in value from each other.

The optical film 100 is placed over the organic LED panel 20 so as to allow passage of light from the plurality of pixels 21, and directly faces the organic LED panel 20 or faces the organic LED panel 20 across a plurality of layers. The optical film 100 includes first and second optical functional parts 101 and 102 differing in optical performance from each other. Moreover, the first and second optical functional parts 101 and 102 are alternately arrayed at predetermined functional part array pitches q in the first direction $D_1$. The functional part array pitches q assume a certain value.

In the present embodiment, the refractive index of the first optical functional part 101 is different from the refractive index of the second optical functional part 102, and the display quality of an image that is viewed via the optical film 100 can be improved by causing light from the organic LED panel 20 to be refracted or reflected by an interface between the first optical functional part 101 and the second optical functional part 102. Although, in the illustration, the first and second optical functional parts 101 and 102 are shaped, for example, such that the interface where they touch each other in the first direction $D_1$ is inclined, these shapes are not limited to particular shapes but may be different from those illustrated. In a through-thickness cross-sectional view, for example, the second optical functional part 102 shown in FIG. 1 is tapered toward one surface, specifically a back surface, of the optical film 100 and toward the organic LED panel 20, and has a tapered end in a flat shape parallel to both sides of the optical sheet 100. A side surface located between a flat surface serving as the tapered end of the second optical functional part 102 and a base end of the second optical functional part 102 is arc-like or multistage-like in shape in a through-thickness cross-sectional view shown in FIG. 1 or, particularly, has the shape of an arc that is convex toward the first optical functional part 101. Note, however, that the side surface of the second optical functional part 102 may be concave to a side opposite to the first optical functional part 101 in the through-thickness cross-sectional view shown in FIG. 1. Further, the refractive index of the first optical functional part 101 may be lower or higher than the refractive index of the second optical functional part 102.

The sign "d" in FIG. 1 denotes the distance in a face-to-face direction between surfaces of the pixel 21 that face the optical film 100 and a surface of the optical film 100 that faces the pixels 21.

Note here that in the display device 10 according to the present embodiment, when the first pixel array pitches p1, the second pixel array pitches p2, the functional part array pitches q, and the distance d are each expressed by the unit "µm", Conditions (1) and Conditions (2) hold as follows:

$q \leq 0.5p1$ and $\tan(\operatorname{asin}(0.7/q)) < p1/d$   Conditions (1):

$q \leq 0.5p2$ and $\tan(\operatorname{asin}(0.7/q)) < p2/d$   Conditions (2):

Upon the satisfaction of Conditions (1) and/or Conditions (2), the viewability of a display image that is formed by the display device 10 can be prevented from being impaired by moire or diffraction. As a result of their diligent study of a relationship between pitches of moire and the pixel array pitches p1 and p2 that, even if moire occurs, makes it difficult to see the moire and a relationship between positions of occurrence of image blurring and the pixel array pitches p1 and p2 that, even if image blurring occurs due to diffraction, makes it difficult to see the image blurring, the inventors finally determined the relationships.

Under Conditions (1) and Conditions (2), first, "$q \leq 0.5p1$" and "$q \leq 0.5p2$" are defined as conditions that make it difficult to see moire. Moire periodically occurs as fringes due to periodicity discrepancies between the pixel array pitches p1 and p2 and the functional part array pitches q. The pitches PM at which moire periodically occurs can be determined by $(p1 \times q)/(p1-q)$ or $(p2 \times q)/(p2-q)$. It should be noted that the latter formula is a formula that is applied in a case where the first and second optical functional parts 101 and 102 are alternately arrayed in the second direction $D_2$. As a result of their diligent thorough studies and experiments, the inventors found that in a case where the pitches PM of moire become equal to or smaller than the pixel array pitches p1 and p2, moire becomes comparatively less conspicuous. Then, the inventor finally determined "$q \leq 0.5p1$" and "$q \leq 0.5p2$" as conditions that satisfy these findings.

Meanwhile, "$\tan(\operatorname{asin}(0.7/q)) < p1/d$" and "$\tan(\operatorname{asin}(0.7/q)) < p2/d$" are defined as conditions that make it difficult to see image blurring caused by diffraction. In a case where diffraction occurs due to the first or second optical functional part 101 or 102 of the optical film 100, a first image blur (diffraction fringe) centered at the first or second optical functional part 101 or 102 appears at a position given by $d \times \tan(\operatorname{asin}(\lambda/q))$. $\lambda$ is a wavelength. The wavelength of red light is approximately 0.7 µm. The wavelength of blue light is approximately 0.47 µm. The wavelength of green light is approximately 0.52 µm. Based on such wavelengths, a first image blur (diffraction fringe) corresponding to red light centered at the first or second optical functional part 101 or 102 appears at a position given by $d \times \tan(\operatorname{asin}(0.7/q))$, and first image blurs (diffraction fringes) corresponding to blue light and green light appear inside the first image blur corresponding to red light.

As a result of their diligent thorough studies and experiments, the inventors found that in a case where the position of a first image blur centered at the first or second optical functional part 101 or 102 becomes smaller than the pixel array pitches p1 and p2, the image blur becomes comparatively less conspicuous. Moreover, the inventors found that if the position of occurrence of a first image blur corresponding to red light becomes smaller than the pixel array pitches p1 and p2, first image blurs respectively corresponding to red light, blue light, and green light become less conspicuous. Then, the inventor finally determined "tan(asin (0.7/q))<p1/d" and "tan(asin(0.7/q))<p2/d" as conditions that satisfy these findings.

Accordingly, upon the satisfaction of Conditions (1) and/or Conditions (2), the viewability of a display image can be prevented from being impaired by moire or diffraction. The inventors have confirmed through a variety of prototypes the effects of the satisfaction of Conditions (1) and/or Conditions (2).

Under Conditions (1) and Conditions (2), the pixel array pitches p1 and p2 and the functional part array pitches q are not limited to particular values. For example, the pixel array pitches p1 and p2 may be set to be smaller than or equal to 316 μm in the case of a 55" monitor (55 inches monitor), or may be set to be smaller than or equal to 155 μm in the case of a 17" monitor (17 inches monitor). Such pixel array pitches p1 and p2 have become gradually smaller with the advancement of technology, and further higher resolution is expected to be achieved in the future.

The formulas defined under Conditions (1) and Conditions (2) are useful in flexibly designing a desirable optical film according to a future trend in pixel array pitch.

Figure 3A:
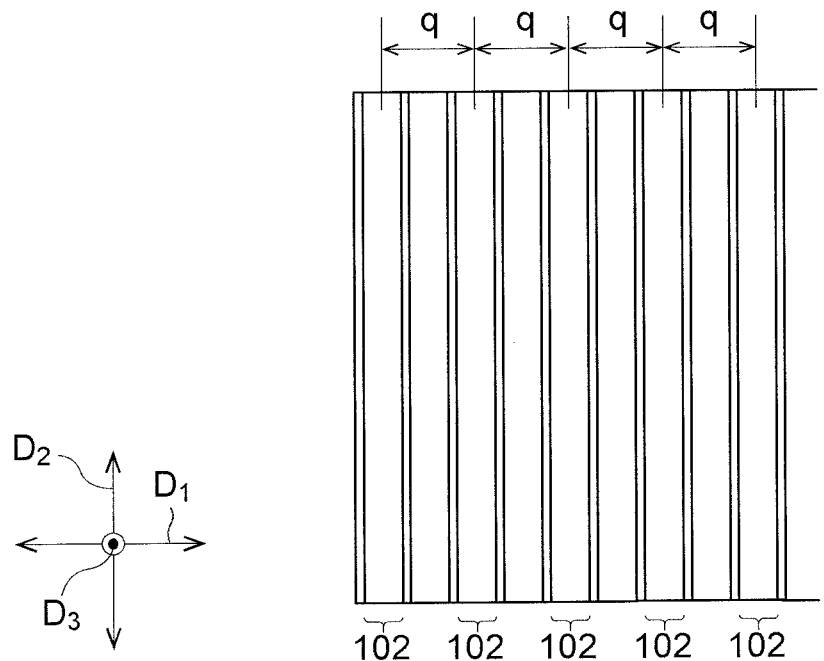
FIG. 3A is a diagram showing an optical film of the display device shown in FIG. 1.

It should be noted that the first and second optical functional parts 101 and 102 shown in FIG. 1 linearly extend, for example, in the second direction $D_2$ and, in this case, when seen in the third direction $D_3$, the first and second optical functional parts 101 and 102 assume shapes shown in FIG. 3A. In this case, if at least Conditions (1): "q≤0.5p1 and tan(asin(0.7/q))<p1/d" hold, the viewability of a display image can be prevented from being impaired by moire or diffraction. That is, the pixel array pitches and the functions array pitches that are defined in the same direction need only satisfy at least, for example, Conditions (1).

Figure 3B:
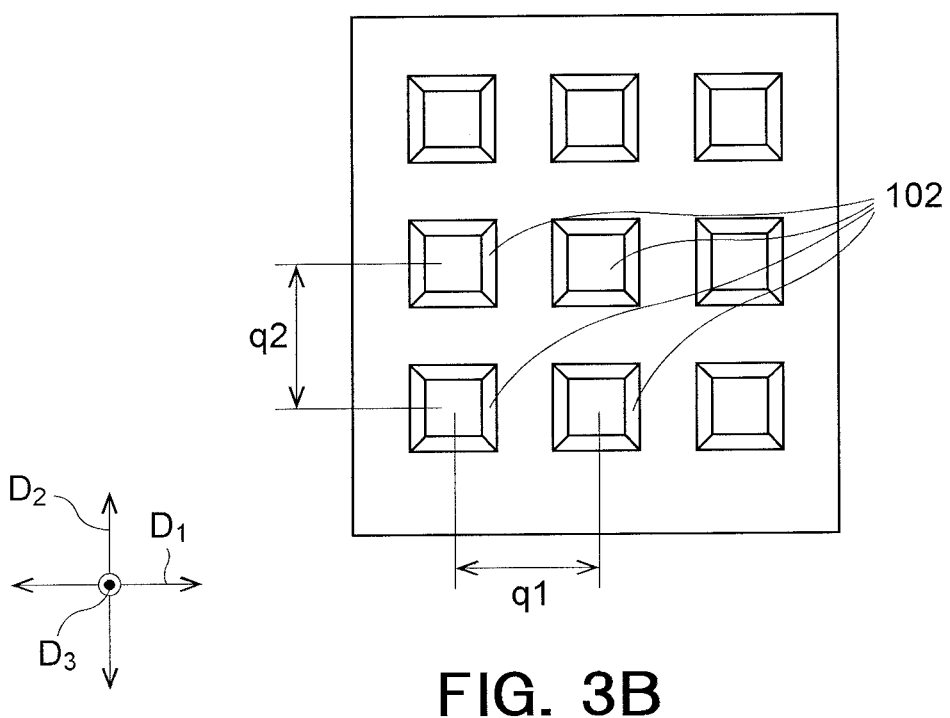
FIG. 3B is a diagram showing an optical film according to a modification of FIG. 3A.

Alternatively, as shown in FIG. 3B, there is a case where second optical functional parts 102 have the shape of, for example, truncated quadrangular pyramids or truncated cones and are two-dimensionally arrayed, for example, in a matrix. In FIG. 3B, the pitch between second optical functional parts 102 in the first direction $D_1$ is defined as a first functional part array pitch q1. The pitch between second optical functional parts 102 in the second direction $D_2$ is defined as a second functional part array pitch q2. That is, in this configuration, the first and second optical functional parts 101 and 102 are alternately arrayed at first functional part array pitches q1 in the first direction $D_1$, and the first and second optical functional parts 101 and 102, and are alternately arrayed at second functional part array pitches q2 in the second direction $D_2$.

In this case, it is desirable that Conditions (1): "q1≤0.5p1 and tan(asin(0.7/q1))<p1/d" and Conditions (2): "q2≤0.5p2 and tan(asin(0.7/q2))<p2/d" hold. In a case where both Conditions (1) and Conditions (2) hold, the viewability of a display image can be effectively prevented from being impaired by moire or diffraction. However, even in a case where only either Conditions (1) or Conditions (2) hold, the viewability of a display image can be prevented from being impaired by moire or diffraction.

It should be noted that a plurality of the second optical functional parts 102 may be shaped to follow one after the other in a reticular pattern, or may be formed, for example, in the shape of truncated hexagonal pyramids arrayed in a honeycomb matrix.

Further, as shown in FIG. 1, the organic LED panel 20 and the optical film 100 are adjacent to each other with an air layer interposed therebetween. Meanwhile, a circularly polarizing plate, a touch panel, a cover glass, or other members may be placed between the organic LED panel 20 and the optical film 100. In such a case where one or more members are present between the organic LED panel 20 and the optical film 100, the refractive index of the one or more members may be taken into account under Conditions (1) and Conditions (2). In this case, the distance d under Conditions (1) and Conditions (2) may be replaced by n×d, which indicates an optical path length. n is a refractive index and normally falls within a range of 1.0 or more and 1.8 or less.

The following describes an example of a method for manufacturing an optical film 100 according to the present embodiment.

First, a display panel over which the optical film 100 is to be placed, e.g. an organic LED panel 20, is determined. Then, the first pixel array pitches p1 and second pixel array pitches p2 of the organic LED panel 20 are determined.

Next, the distance d (μm) in a face-to-face direction between surfaces of the pixels 21 that face the optical film 100 and a surface of the optical film 100 that faces the pixels 21 is determined. The distance d (μm) is a distance at which the optical film 100 is placed over the organic LED panel 20. Since the distance d may vary depending on whether a member is provided between the optical film 100 and the organic LED panel 20, how it is related to the thickness of the display device to be manufactured, or other factors, the distance d needs to be determined as appropriate according to the specifications of the display device. Further, when the refractive index n of a member between the optical film 100 and the organic LED panel 20 is taken into account, the optical path length n×d is determined.

After that, on the basis of the first pixel array pitches p1, the second pixel array pitches p2, and the distance d thus determined, the functional part array pitches q (μm) of the optical film 100 are determined so that Conditions (1): q≤0.5p1 and tan(asin(0.7/q))<p1/d and/or Conditions (2): q≤0.5p2 and tan(asin(0.7/q))<p2/d hold. In the optical film 100 thus manufactured, the first and second optical functional parts 101 and 102 are arrayed at the functional part array pitches q thus determined.

Such a manufacturing method makes it possible to easily manufacture a display device capable of preventing the viewability of a display image from being impaired by moire or diffraction.

Figure 4:
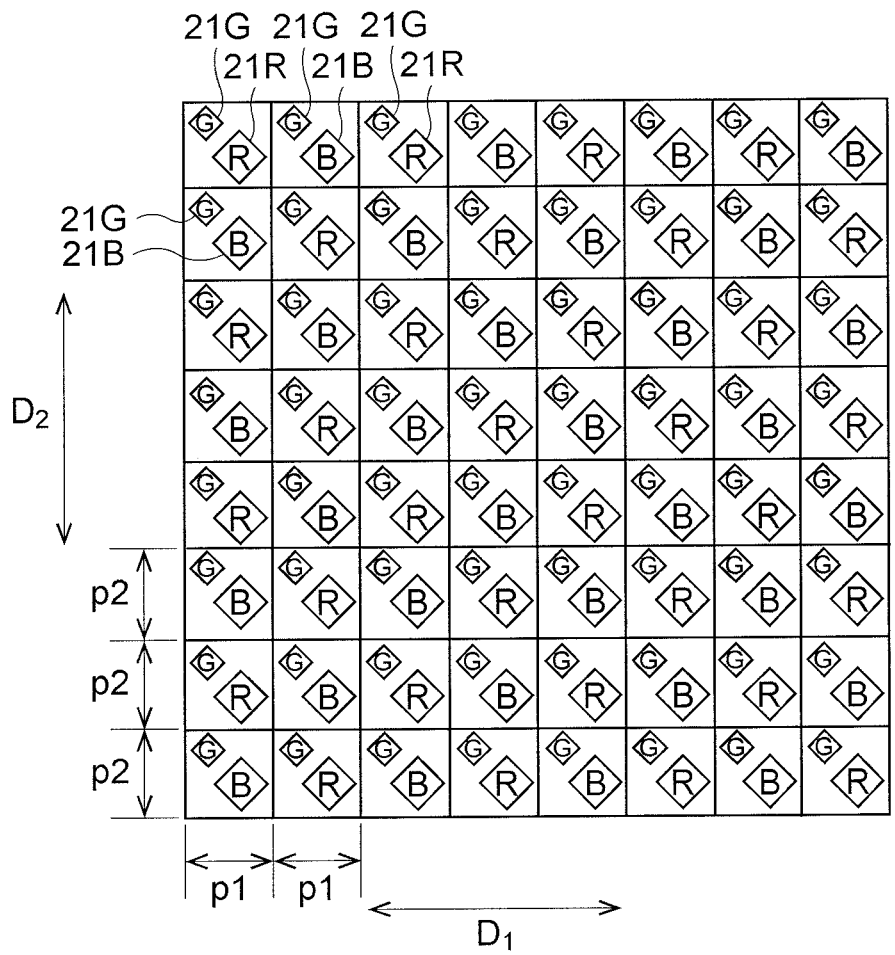
FIG. 4 is a diagram showing a modification of the display device shown in FIG. 1.
Figure 5:
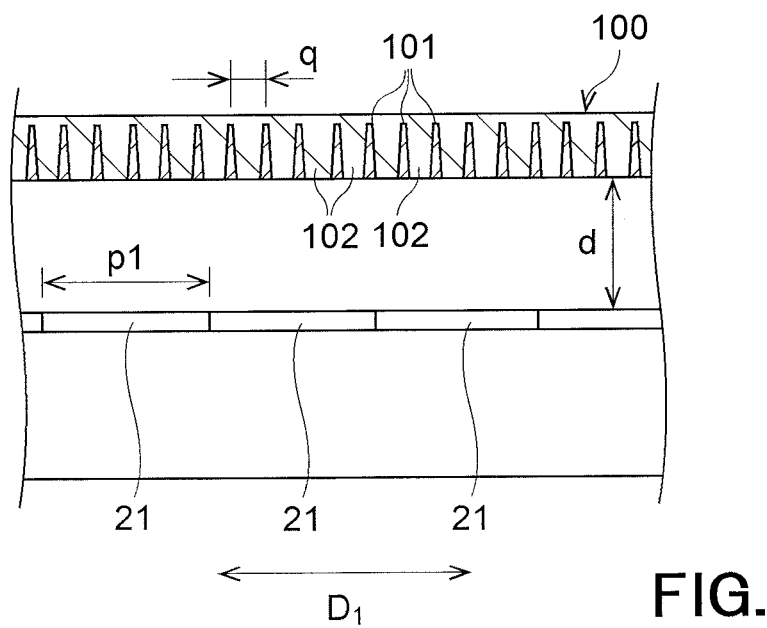
FIG. 5 is a diagram showing a modification of the display device shown in FIG. 1.

Although the foregoing has described an embodiment of the present disclosure, the foregoing embodiment is just an example, and various modifications can be added to the aforementioned display device 10. For example, as shown in FIG. 4, each of the pixels 21 may include a plurality of subpixels 21R, 21G, and 21B arrayed in a PenTile matrix. Further, as shown in FIG. 5, the optical film 100 may be a so-called louver film. In this case, the first optical functional part 101 serves as a light-absorbing portion, and the second optical functional part 102 serves as a light-transmitting portion. Further, although not illustrated, a liquid crystal panel may be used instead of the organic LED panel 20 to constitute a display device.

In a case where each of the pixels 21 includes a plurality of subpixels 21R, 21G, and 21B arrayed in a PenTile matrix, a pixel array direction may be defined by a direction that is different from the first or second direction $D_1$ or $D_2$ shown n FIG. 4. In the example shown in FIG. 4, a direction inclined at 45 degrees with respect to the first or second direction $D_1$ or $D_2$ too may be defined as a pixel array direction. In such a case, pixel array pitches in a pixel array direction forming the smallest angle (including 0 degree) with a direction defining functional part array pitches may be adopted under Conditions (1) and Conditions (2). In other words, the present embodiment assumes a case where an optical film is designed by adopting, under Conditions (1) and Conditions (2), pixel array pitches and functional part array pitches that are defined in the same direction and a case where an optical film is designed by determining a direction defining pixel array pitches and a direction defining functional part array pitches that form the smallest angle except 0 degree and adopting, under Conditions (1) and Conditions (2), the pixel array pitches and the functional part array pitches thus defined in the two directions.

EXAMPLES

The following describes examples of the present disclosure and comparative examples thereof.

Display devices according to Examples 1 to 9 are embodied as shown in FIG. 1 and satisfy Conditions (1) and Conditions (2), which are described in the foregoing embodiment. Meanwhile, display devices according to Comparative Examples 1 to 4 are embodied as shown in FIG. 1 but do not satisfy the aforementioned Conditions (1) or Conditions (2). Display devices according to the examples and the comparative examples are obtained by configuring the specific dimensional settings for the display device 10 described in the embodiment. The optical film 100 is a stripe type in which the first and second optical functional parts 101 and 102 are arrayed at functional part array pitches q in the first direction $D_1$.

Example 1

The first pixel array pitches p1 and the second pixel array pitches p2 are 111 μm.
The functional part array pitches q are 55 μm.
The distance d is 1270 μm.
0.5p1 and 0.5p2 are 55.5 μm.
tan(asin(0.7/q)) is approximately 0.0127, and p1/d and p2/d are approximately 0.087.
Therefore, Conditions (1): q≤0.5p1 and tan(asin(0.7/q))<p1/d and Conditions (2): q≤0.5p2 and tan(asin(0.7/q))<p2/d hold.

Example 2

The first pixel array pitches p1 and the second pixel array pitches p2 are 111 μm.
The functional part array pitches q are 43.8 μm.
The distance d is 1270 μm.
0.5p1 and 0.5p2 are 55.5 μm.
tan(asin(0.7/q)) is approximately 0.0159, and p1/d and p2/d are approximately 0.087.
Therefore, Conditions (1): q≤0.5p1 and tan(asin(0.7/q))<p1/d and Conditions (2): q≤0.5p2 and tan(asin(0.7/q))<p2/d hold.

Example 3

The first pixel array pitches p1 and the second pixel array pitches p2 are 111 μm.
The functional part array pitches q are 31.8 μm.
The distance d is 1270 μm.
0.5p1 and 0.5p2 are 55.5 μm.
tan(asin(0.7/q)) is approximately 0.0220, and p1/d and p2/d are approximately 0.087.
Therefore, Conditions (1): q≤0.5p1 and tan(asin(0.7/q))<p1/d and Conditions (2): q≤0.5p2 and tan(asin(0.7/q))<p2/d hold.

Example 4

The first pixel array pitches p1 and the second pixel array pitches p2 are 111 μm.
The functional part array pitches q are 25.0 μm.
The distance d is 1270 μm.
0.5p1 and 0.5p2 are 55.5 μm.
tan(asin(0.7/q)) is approximately 0.0280, and p1/d and p2/d are approximately 0.087.
Therefore, Conditions (1): q≤0.5p1 and tan(asin(0.7/q))<p1/d and Conditions (2): q≤0.5p2 and tan(asin(0.7/q))<p2/d hold.

Example 5

The first pixel array pitches p1 and the second pixel array pitches p2 are 111 μm.
The functional part array pitches q are 8.6 μm.
The distance d is 1270 μm.
0.5p1 and 0.5p2 are 55.5 μm.
tan(asin(0.7/q)) is approximately 0.08615, and p1/d and p2/d are approximately 0.087.
Therefore, Conditions (1): q≤0.5p1 and tan(asin(0.7/q))<p1/d and Conditions (2): q≤0.5p2 and tan(asin(0.7/q))<p2/d hold.

Example 6

The first pixel array pitches p1 and the second pixel array pitches p2 are 111 μm.
The functional part array pitches q are 8.1 μm.
The distance d is 1270 μm.
0.5p1 and 0.5p2 are 55.5 μm.
tan(asin(0.7/q)) is approximately 0.0867, and p1/d and p2/d are approximately 0.087.
Therefore, Conditions (1): q≤0.5p1 and tan(asin(0.7/q))<p1/d and Conditions (2): q≤0.5p2 and tan(asin(0.7/q))<p2/d hold.

Example 7

The first pixel array pitches p1 and the second pixel array pitches p2 are 111 μm.
The functional part array pitches q are 3.0 μm.
The distance d is 450 μm.
0.5p1 and 0.5p2 are 55.5 μm.
tan(asin(0.7/q)) is approximately 0.0240, and p1/d and p2/d are approximately 0.2466.
Therefore, Conditions (1): q≤0.5p1 and tan(asin(0.7/q))<p1/d and Conditions (2): q≤0.5p2 and tan(asin(0.7/q))<p2/d hold.

Example 8

The first pixel array pitches p1 and the second pixel array pitches p2 are 111 μm.
The functional part array pitches q are 1.6 μm.
The distance d is 220 μm.
0.5p1 and 0.5p2 are 55.5 μm.
tan(asin(0.7/q)) is approximately 0.0477, and p1/d and p2/d are approximately 0.5045.
Therefore, Conditions (1): q≤0.5p1 and tan(asin(0.7/q))<p1/d and Conditions (2): q≤0.5p2 and tan(asin(0.7/q))<p2/d hold.

Example 9

The first pixel array pitches p1 and the second pixel array pitches p2 are 111 μm.

The functional part array pitches q are 1.0 µm.
The distance d is 100 µm.
0.5p1 and 0.5p2 are 55.5 µm.
tan(asin(0.7/q)) is approximately 0.9802, and p1/d and p2/d are approximately 1.11.
Therefore, Conditions (1): q≤0.5p1 and tan(asin(0.7/q))<p1/d and Conditions (2): q≤0.5p2 and tan(asin(0.7/q))<p2/d hold.

Comparative Example 1

The first pixel array pitches p1 and the second pixel array pitches p2 are 111 µm.
The functional part array pitches q are 60 µm.
The distance d is 1270 µm.
0.5p1 and 0.5p2 are 55.5 µm.
tan(asin(0.7/q)) is approximately 0.01166, and p1/d and p2/d are approximately 0.087.
Therefore, q≤0.5p1 and q≤0.5p2 do not hold. Meanwhile, tan(asin(0.7/q))<p1/d and tan(asin(0.7/q))<p2/d hold.

Comparative Example 2

The first pixel array pitches p1 and the second pixel array pitches p2 are 111 µm.
The functional part array pitches q are 3.0 µm.
The distance d is 1270 µm.
0.5p1 and 0.5p2 are 55.5 µm.
tan(asin(0.7/q)) is approximately 0.02487, and p1/d and p2/d are approximately 0.2466.
Therefore, while q≤0.5p1 and q≤0.5p2 hold, tan(asin(0.7/q))<p1/d and tan(asin(0.7/q))<p2/d do not hold.

Comparative Example 3

The first pixel array pitches p1 and the second pixel array pitches p2 are 111 µm.
The functional part array pitches q are 1.6 µm.
The distance d is 450 µm.
0.5p1 and 0.5p2 are 55.5 µm.
tan(asin(0.7/q)) is approximately 0.0486, and p1/d and p2/d are approximately 0.24665.
Therefore, while q≤0.5p1 and q≤0.5p2 hold, tan(asin(0.7/q))<p1/d and tan(asin(0.7/q))<p2/d do not hold.

Comparative Example 4

The first pixel array pitches p1 and the second pixel array pitches p2 are 111 µm.
The functional part array pitches q are 1.0 µm.
The distance d is 220 µm.
0.5p1 and 0.5p2 are 55.5 µm.
tan(asin(0.7/q)) is approximately 0.9802, and p1/d and p2/d are approximately 0.5045.
Therefore, while q≤0.5p1 and q≤0.5p2 hold, tan(asin(0.7/q))<p1/d and tan(asin(0.7/q))<p2/d do not hold.

Evaluations were made by visually verifying whether moire and image blurring were conspicuous. In all of Examples 1 to 9, neither moire nor image blurring was conspicuous. Meanwhile, in Comparative Example 1, moire was somewhat conspicuous. In Comparative Examples 2 to 4, image blurring was quite conspicuous. From these results too, the effects of the present disclosure were confirmed.

The invention claimed is:
1. A display device comprising:
a display panel that emits light from a plurality of pixels arrayed at predetermined pixel array pitches;
an optical film, placed over the display panel so as to allow passage of light from the plurality of pixels, that includes first and second optical functional parts differing in refractive index from each other, the first and second optical functional parts being arrayed at a certain functional part array pitch; and
a circularly polarizing plate between the display panel and the optical film,
wherein the display panel is an organic LED panel,
wherein the pixel array pitches are smaller than or equal to 155 µm,
wherein the second optical functional part has a flat top-end surface and a side surface between the top-end surface and a base end thereof, the side surface having an arc shape that is convex toward the first optical functional part, and
wherein assuming that p (µm) denotes the pixel array pitches, that q (µm) denotes the functional part array pitches, and that d (µm) denotes a distance in a face-to-face direction between surfaces of the pixels that face the optical film and a surface of the optical film that faces the pixels, q≤0.5p and tan (asin (0.7/q))<p/d hold.
2. The display device according to claim 1, wherein each of the pixels includes a plurality of subpixels arrayed in a PenTile matrix.
3. A display device comprising:
a display panel that emits light from a plurality of pixels arrayed at predetermined pixel array pitches; and
an optical film, placed over the display panel so as to allow passage of light from the plurality of pixels, that includes first and second optical functional parts differing in refractive index from each other, the first and second optical functional parts being arrayed at a certain functional part array pitch; and
a circularly polarizing plate between the display panel and the optical film,
wherein the display panel is an organic LED panel,
wherein the pixel array pitches are smaller than or equal to 155 µm,
wherein the second optical functional part has a flat top-end surface and a side surface between the top-end surface and a base end thereof, the side surface having an arc shape that is convex toward the first optical functional part, and
wherein assuming that p (µm) denotes the pixel array pitches, that q (µm) denotes the functional part array pitches, that the first and second optical functional parts are arrayed at the functional part array pitches q in a direction identical to a direction in which the plurality of pixels are arrayed at the pixel array pitches p, and that d (µm) denotes a distance in a face-to-face direction between surfaces of the pixels that face the optical film and a surface of the optical film that faces the pixels, q≤0.5p and tan (asin (0.7/q))<p/d hold.
4. A method for manufacturing an optical film that is placed over a display panel and a circularly polarizing plate,
wherein the display panel emits light from a plurality of pixels arrayed at predetermined pixel array pitches smaller than or equal to 155 µm,
wherein the circularly polarizing plate is located between the display panel and the optical film,
wherein the display panel is an organic LED panel,
wherein the optical film including first and second optical functional parts differing in refractive index from each other, the first and second optical functional parts being arrayed at a certain functional part array pitch, wherein the second optical functional part has a flat top-end surface and a side surface between the top-end surface and a base end thereof, the side surface having an arc shape that is convex toward the first optical functional part, and wherein the method comprises the steps of:

determining the pixel array pitches p (μm);

determining a distance d (μm) in a face-to-face direction between surfaces of the pixels that face the optical film and a surface of the optical film that faces the pixels, the distance d (μm) being a distance at which the optical film is placed over the display panel; and determining the functional part array pitches as q (μm) so that $q \leq 0.5p$ and $\tan(\operatorname{asin}(0.7/q)) < p/d$ hold, wherein the optical film is manufactured on the basis of the functional part array pitches q (μm) thus determined.

* * * * *